Jan. 18, 1972          L. E. GARDNER          3,636,172
DEHALOGENATION OF FLUOROHALOCARBONS
Filed Oct. 29, 1969
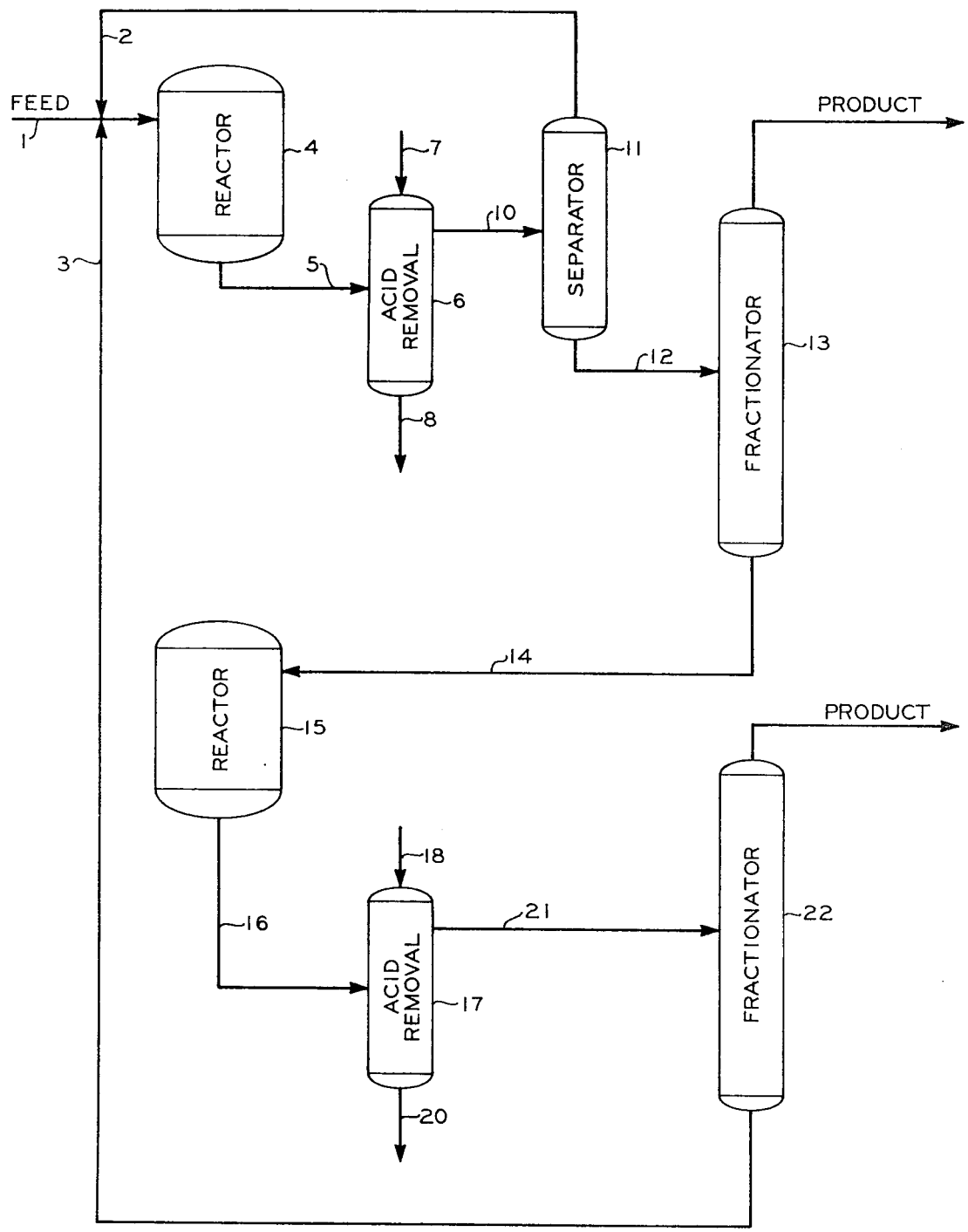
INVENTOR.
L. E. GARDNER
BY
ATTORNEYS United States Patent Office 3,636,172
Patented Jan. 18, 1972

3,636,172
DEHALOGENATION OF FLUOROHALOCARBONS
Lloyd E. Gardner, Bartlesville, Okla., assignor to
Phillips Petroleum Company
Filed Oct. 29, 1969, Ser. No. 872,007
Int. Cl. C07c 17/34, 21/18
U.S. Cl. 260—635.5                              4 Claims

ABSTRACT OF THE DISCLOSURE

Fluorohalocarbons are dehalogenated to produce fluoroolefins by contacting first in the presence of hydrogen with a first catalytic composition containing fluorine under mild hydrogenolysis conditions to generate a fluorohalohydrocarbon, followed by contacting with a second catalytic composition containing a metal oxide or metal salt under more severe conditions in the absence of hydrogen to form increased yields of fluoroolefins.

BACKGROUND OF THE INVENTION

This invention relates to the dehalogenation of fluorohalocarbons. In accordance with one aspect, this invention relates to an improved process for the dehalogenation of fluorohalocarbons in plural stages using different catalysts and different reaction conditions to remove chlorine, bromine or iodine from the fluorohalocarbons to form an olefinic bond. In accordance with a further aspect, this invention relates to an improved process resulting in an increase in yield of fluoroolefin and a decrease in halogen acid production, as well as a decrease in carbon production, by dehalogenating fluorohalocarbons first under mild hydrogenolysis conditions with a first catalyst followed by selective dehydrohalogenation in the absence of hydrogen by contacting with a different second catalyst to produce fluoroolefins.

Processes for the dehalogenation of fluorohalocarbons using a variety of supports and catalysts are well known. However, short catalyst life and deterioration of supports caused by the highly reactive compounds formed during the reaction and by deposition of polymeric materials on the catalyst compositions have reduced the effectiveness of the prior art processes.

The previous catalytic hydrogenolysis of fluorohalocarbons to yield fluoroolefins has generally been the disadvantageous one-stage process. The one-stage process can be carried out in high per pass conversion, but fluoroolefin, for example, tetrafluoroethylene, yields were low due to high rates of degradation to carbon and hydrogen fluoride. Alternatively, the one-step process can be carried out in low per pass conversion to afford improved yields of fluoroolefin, but then numerous by-products are formed. Clearly, neither alternative is satisfactory.

The process of the present invention is a novel, plural-stage process which makes possible remarkably higher yields of fluoroolefin, for example, tetrafluoroethylene, without formation of either large amounts of by-products or large amounts of carbon and hydrogen fluoride.

Accordingly, an object of this invention is to provide an improved process for the production of fluoroolefins.

Another object of this invention is to provide a process for increasing the yield of fluoroolefin production from fluorohalocarbons.

Another object of this invention is to provide a process minimizing the production of undesirable by-products normally produced during the dehalogenation of fluorohalocarbons.

Other aspects and objects, as well as the several advantages of the invention, will be apparent to one skilled in the art upon studying the disclosure.

STATEMENT OF THE INVENTION

In accordance with the invention, there is provided a process for the dehalogenation of fluorohalocarbons to produce fluoroolefins which comprises subjecting the fluorohalocarbons to mild hydrogenolysis by contacting with a first catalyst in the presence of hydrogen to generate a fluorohalohydrocarbon followed by selective dehydrogenation in the absence of hydrogen by contacting with a second catalyst.

The advantages of the process of this invention are higher ultimate yields of fluoroolefin, for example, tetrafluoroethylene, as well as less degradation to halogen acids and carbon.

As used herein, the term "fluorohalocarbons" means saturated compounds containing only carbon, fluorine and non-fluorine halogen. The term "fluorohalohydrocarbons" means saturated compounds containing only carbon, fluorine, non-fluorine halogen and hydrogen.

In accordance with one embodiment of the invention, fluorohalocarbons are first subjected to mild hydrogenolysis in a first stage by contacting with a fluorided catalyst in the presence of hydrogen to generate a fluorohalohydrocarbon, then subjecting the fluorohalohydrocarbon to selective dehydrohalogenation in the absence of hydrogen in a second stage by contacting with a metal oxide or metal salt catalyst.

In accordance with a specific embodiment of the invention, fluorohalocarbons are dehalogenated in at least two stages by contacting with different catalysts wherein the conditions of dehalogenation are less severe than in a successive stage.

In a specific embodiment, 1,2-dichlorotetrafluoroethane is converted to tetrafluoroethylene by first subjecting same to mild hydrogenolysis in the presence of hydrogen and a fluorided catalyst comprising a metal phosphate and alumina to form 1-chloro-1,1,2,2-tetrafluoroethane and the product thus formed is then subjected to selective dehydrochlorination in the absence of hydrogen in a second stage by contacting with a metal oxide or a metal halide catalyst supported on alumina or charcoal to produce increased yields of tetrafluoroethylene.

The advantages of the two-stage process over the previous tetrafluoroethylene processes from 1,2-dichlorotetrafluoroethane hydrogenolysis are as follows: (1) Mild conditions in the first stage minimize carbon formation and loss of fluorine by way of hydrogen fluoride formation. (2) Less frequent catalyst regeneration is required due to lower rates of carbon formation. (3) Higher ultimate tetrafluoroethylene yields result due to decreased degradation to hydrogen fluorine and carbon. (4) The higher hydrogen chloride to hydrogen fluoride ratio improves separation, recovery, and recycle of these acids in usable form for various processes.

DESCRIPTION OF THE PREFERRED EMBODIMENTS

The process of this invention is generally applicable to fluorohalocarbons containing from 2 to 10 carbon atoms or more. The non-fluorine halogen or halogens to be removed can be any of chlorine, bromine, and/or iodine. When non-fluorine halogens are present on adjacent carbon atoms, non-fluorine halogen is removed from both of the adjacent carbon atoms to yield an olefinic bond.

Among the fluorohalocarbons which can be dehalogenated in accordance with the practice of this invention are 1,2-dichlorotetrafluoroethane,
1,1-dichloro-2-bromo-trifluoroethane, 1-bromo-2-iodo-6-chloropentadecafluorooctane,
1-bromo-1,1,2,2-tetrafluoroethane,
1-bromo-2-chloro-3-iodo-5-(trifluoromethyl)-tetradecafluorooctane,
1,1,2-tribromo-2,2-dichlorofluoroethane,
1,1,2-trichloro-2,2,1-trifluoroethane,
octafluoro-2,3-dichlorobutane, and the like.

The process of the invention can be used for production of perfluoro-olefins and halofluoroolefins containing from 2 to 10 carbon atoms as well as for the preparation of perfluoro-cycloolefins such as perfluoro-cyclobutene. Thus, this process is applicable to both open chain and closed chain fluorohalocarbon compounds.

The catalytic compositions of the invention used in the mild hydrogenolysis stage comprise at least one metal phosphate and a fluorine-containing alumina support or base. The metals forming the metal phosphate can be any metal selected from Groups I–B, II–B, VI–B and Group VIII of the periodic table of the elements [Handbook of Chemistry and Physics, Chemical Rubber Co., 45th ed. (1964), p. B–2]. Presently preferred metal phosphates, as indicated above, are chromium phosphate, phosphates of the iron group metals, especially nickel phosphate.

The fluorided alumina (or aluminum fluoride) portion of the catalyst is ordinarily low surface area after treatment with hydrogen fluoride (in the range of 5–50 square meters per gram). Before fluoridation, the aluminas preferably have surface areas in the range of 100–250 square meters per gram. Examples are eta or gamma alumina. These aluminas retain adequate physical strength after fluoridation.

The amount of metal phosphate promoter, expressed as the concentration of the free metal, in the catalyst generally is in the range of 0.1 to 10 weight percent of the catalyst composite, usually being no greater than about 3 weight percent of the catalyst composite. The balance of the catalyst composite is preferably a fluorided alumina. The amount of fluorine present in the fluorided alumina will ordinarily be in the range of 50 to 68 weight percent, ordinarily not greater than about 60 weight percent of the fluorided alumina.

As indicated hereinbefore, it has been found that metal phosphates, especially nickel and chromium phosphate, make effective and durable hydrogenolysis catalysts when supported on fluorinated alumina. In the preparation of the catalyst, a solution of the metal phosphate is used to impregnate the alumina base which is preferably gamma-alumina. The excess solution is removed or drained from the impregnated alumina and the impregnated alumina is then dried and ordinarily heated by calcination at an elevated temperature for a period of time. The calcined metal phosphate-alumina is then activated by the vapor phase reaction of hydrogen fluoride in the presence or absence of an inert gaseous diluent such as nitrogen by contacting at an elevated temperature in the range of 200 to 700° F.; preferably hydrogen fluoride diluted with nitrogen at a temperature of about 300° F. is passed over or through the bed of metal phosphate-alumina and the contacting is continued until a hot zone of reaction passes through the bed of catalytic material. The final temperature ordinarily reaches 550–650° F. After the hot zone of reaction is passed through the catalytic mass, the catalyst is ready for contacting with a fluorohalocarbon compound.

As mentioned above, the aluminum fluoride-containing catalytic compositions can be readily regenerated. A suitable method of regeneration comprises passing an oxygen-containing gas such as air over the catalytic composition while maintaining same at a sufficiently elevated temperature until substantially all carbon-containing compounds thereon are oxidized.

Although the reaction temperature employed in the first stage can vary over a broad range, it will generally be within the range of 400–800° F., usually being within the range of about 550–650° F. The composition of the gaseous feed, expressed in moles of hydrogen per mole of 1,2-dichlorotetrafluoroethane, is preferably in the range of 1–10 but can vary from values of from 0.5–50. The flow rate of the gaseous feed will generally be within the range of about 5–5000 volumes (standard conditions) per volume of catalyst per hour, usually being within the range of 100–500 volumes (standard conditions) per volume of catalyst per hour. Usually the total pressure will be within the range of 0.1–20 atmospheres, preferably being within the range of 1–5 atmospheres. Preferably, the catalyst will be fluorided nickel phosphate on high surface alumina or nickel phosphate supported on aluminum fluoride. The catalyst specification may be broadened to include other phosphates, e.g., cobalt, copper, chromium, iron, and the like, as alternatives to nickel.

The catalyst composition employed for the selective dehydrohalogenation in the absence of hydrogen following mild hydrogenolysis can be metal oxide such as cobalt, nickel, zinc, chromium, or iron or a metal halide such as nickel chloride, zinc chloride, cobalt chloride, barium chloride supported on either a low surface area alumina or charcoal. The metals forming the metal oxide or metal halide can be any metal selected from Groups II–A, II–B, VI–B and VIII of the periodic table of the elements [Handbook of Chemistry and Physics, Chemical Rubber Co., 45th ed. (1964), p. B–2]. The aluminas that can be employed include those defined above with respect to the metal phosphate catalysts.

The reaction temperature employed in the second stage may vary from 400–800° F. with a preferred range being 650–750° F. The flow rate of the gaseous feed (1,2-dichlorotetrafluoroethane and 1-chlorotetrafluoroethane) will generally be within the range of 5–5000 volumes (standard conditions) per volume of catalyst per hour, usually being within the range of 100–500 volumes (standard conditions) per volume of catalyst per hour. The total pressure may vary from 0.1–20 atmospheres, preferably being within the range of 1–5 atmospheres.

The reactors can vary in size and shape, but preferably they will be tubular in design (see flow diagram) and made of nickel, Monel, or the like. The acid removal units contain water or dilute caustic solution through which the reaction products are dispersed. In general, any suitable reactor design and separation, or purification steps can be employed.

The plural stage process of the invention in which a fluorohalocarbon is converted to a fluoroolefin may be illustrated and exemplified by the specific embodiment summarized below in reference to the accompanying flow diagram. This flow diagram shows a typical equipment arrangement suitable for the process of this invention.

The initial feed comprising hydrogen and 1,2-dichlorotetrafluoroethane in line 1 mixes with recycled hydrogen from line 2 and recycled 1,2-dichlorotetrafluoroethane from line 3 to enter reactor 4 where mild hydrogenolysis occurs. The effluent from reactor 4, comprising 1,2-dichlorotetrafluoroethane, 1 - chloro - 1,1,2,2 - tetrafluoroethane, tetrafluoroethylene, hydrogen chloride, hydrogen fluoride and hydrogen, passes through line 5 into acid removal unit 6 wherein water or dilute caustic solution entering from line 7 dissolve and remove hydrogen acids through line 8. The effluent from acid removal unit 6 comprising 1,2 - dichlorotetrafluoroethane, 1 - chloro-1,1,2,2-tetrafluoroethane, tetrafluoroethylene and hydrogen passes through line 10 to enter separator 11. Hydrogen from the separator is recycled through line 2 to reactor 4 and the other three compounds leave the separator by line 12 to enter the fractionator 13. The product, tetrafluoroethylene, exits fractionator 13 as shown and 1,2-dichlorotetrafluoroethane with 1-chloro-1,1,2,2-tetrafluoroethane pass through line 14 to reactor 15 where dehydrochlorination occurs. The effluent from reactor 15, comprising 1,2-dichlorotetrafluoroethane, tetrafluoroethylene and hydrogen chloride passes through line 16 into acid removal unit 17 wherein water or dilute caustic solution entering from line 18 dissolve and remove hydrogen chloride through line 20. The effluent from acid removal unit 17 comprising 1,2-dichlorotetrafluoroethane and tetrafluoroethylene passes through line 21 to enter fractionator 22. The product, tetrafluoroethylene, exits fractionator 22 as shown and 1,2-dichlorotetrafluoroethane is recycled through line 3 to reactor 4. Valves, additional pipes and other suitable equipment are not shown but are considered present.

EXAMPLE I

Comparative example for one-stage process

A mixture of hydrogen and 1,2-dichlorotetrafluoroethane, in a mole ratio of 4.2 hydrogen to 1,2-dichlorotetrafluoroethane, at 1 atmosphere pressure, was passed over a catalyst of fluorided nickel phosphate on high surface alumina at 750° F. for 3 hours. The feed rate was 140 volumes of gaseous feed per volume of catalyst per hour. The results of the reaction appear in the comparative tabulation below in Table I.

EXAMPLE II

Two-stage process of the invention

*First stage.*—A mixture of hydrogen and 1,2-dichlorotetrafluoroethane, in a mole ratio of 8.5 hydrogen to 1,2-dichlorotetrafluoroethane, at 1 atmosphere pressure, was passed over a catalyst of fluorided nickel phosphate on high surface alumina at 600° F. for 2 hours. The feed rate was 290 volumes of gaseous feed per volume of catalyst per hour.

*Second stage.*—A product mixture from 1,2-dichlorotetrafluoroethane hydrogenolysis comprising 1,2-dichlorotetrafluoroethane, 1-chlorotetrafluoroethane and 1,1,2,2-tetrafluoroethane, in molar composition 50/11.5/1, at 1 atmosphere, was passed over a barium chloride charcoal catalyst at 750° F. for 40 minutes. The feed rate of 20 volumes of gaseous feed per volume of catalyst per hour. The results of the two-stage process appear in the comparative tabulation in Table I.

The advantages of the invention, i.e., the two-stage process comprising a mild hydrogenolysis followed by a selective dehydrochlorination, are readily apparent over the previous one-stage process by a tabulation of pertinent data (see Table I). These data show a 20.9 percent increase in tetrafluoroethylene production. An effective elimination of chlorotrifluoroethylene as a by-product, a 27.8 percent decrease in acid production, a 72.6 percent decrease in decomposition to carbon, and elimination of cracking to miscellaneous low molecular weight species ("lights"). Thus, it is shown that the above cited advantages of the invention are realized by its practice, that the process of the invention affords substantial and important improvements over the previous one-stage process for tetrafluoroethylene production from the hydrogenolysis of 1,2-dichlorotetrafluoroethane.

TABLE I

| | Percent ultimate yield [1] of— | | Combined acids as weight percent of 1,2-dichlorotetrafluoroethylene reacted | Weight percent of carbon in dichlorotetrafluoroethylene converted to carbon on the catalyst | Weight percent of dichlorotetrafluoroethylene converted to "lights" |
|---|---|---|---|---|---|
| | Tetrafluoroethylene | Chlorotrifluoroethylene | | | |
| One-step process | 58.9 | 4.4 | 49.3 | 19.0 | 4.8 |
| Two-step process | 71.2 | Negligible | 35.6 | 5.2 | 0.0 |

[1] Value calculated for recycling unreacted 1,2-dichlorotetrafluoroethane and 1-chlorotetrafluoroethane, respectively, until completely reacted.

I claim:
1. An improved process for the production of fluoroolefins from fluorohalocarbons which comprises:
   (a) subjecting a saturated fluorohalocarbon compound having from 2 to 10 carbon atoms per molecule, inclusive, to a mild hydrogenolysis carried out at a temperature within the range of 400–800° F., a pressure in the range of 0.1–20 atmospheres, at a gaseous hourly space velocity in the range of about 5–5000 volumes (standard conditions) per volume of catalyst per hour, and in the presence of an amount of hydrogen in the range of 0.5–50 moles of hydrogen per mole of fluorohalocarbon with a catalyst of calcined nickel or chromium phosphate on eta or gamma alumina activated by vapor phase reaction of hydrogen fluoride at a temperature range of 200 to 700° F. to generate a saturated fluorohalohydrocarbon, wherein at least one halogen removed from said fluorohalocarbon by said mild hydrogenolysis is chlorine, bromine or iodine, and wherein carbon formation and loss of fluorine by way of hydrogen fluoride formation is minimized, and
   (b) subjecting said fluorohalohydrocarbon to selective dehydrohalogenation under more severe conditions by contacting same with one of a metal oxide and a metal halide formed from a metal selected from cobalt, nickel, zinc, chromium, iron, and barium, supported on one of alumina and charcoal, in the absence of added hydrogen at a temperature in the range of 400–800° F. and a gaseous hourly space velocity and pressure the same as in (a) to produce fluoroolefin as product.

2. A process according to claim 1 wherein conditions in (a) include a temperature in the range of 550–650° F., hydrogen in the range of 1–10 moles of hydrogen per mole of fluorohalocarbon, a gaseous hourly space velocity in the range of 100–500 volumes (standard conditions) per volume of catalyst per hour and a reaction pressure in the range of 1–5 atmospheres, and wherein the conditions in (b) include a temperature in the range of 650–750° F. and a gaseous hourly space velocity and reaction pressure the same range as in (a).

3. A process according to claim 1 wherein the effluent from (a) is subjected to separation to recover therefrom halogen acids, hydrogen and fluoroolefin produced and the remainder of the effluent is passed to step (b) and the effluent from step (b) subjected to separation to recover therefrom halogen acids and fluoroolefin and the unreacted fluorohalocarbon is recycled to step (a).

4. A process according to claim 2 wherein the fluorohalocarbon is 1,2-dichlorotetrafluoroethane, the catalyst in (a) is a calcined nickel phosphate-alumina activated by vapor phase reaction of hydrogen fluoride within a temperature range of about 200 to about 700° F. and the catalyst in (b) is barium chloride supported on charcoal.

References Cited
UNITED STATES PATENTS

| | | | |
|---|---|---|---|
| 2,685,606 | 8/1954 | Clark | 260—653.5 |
| 2,912,470 | 11/1959 | Kirchner, Jr. et al. | 260—653.5 |

DANIEL D. HORWITZ, Primary Examiner

U.S. Cl. X.R.

252—437, 447, 441